(12) United States Patent
Ogawa

(10) Patent No.: US 9,236,623 B2
(45) Date of Patent: Jan. 12, 2016

(54) FUEL CELL SYSTEM

(75) Inventor: Tomoya Ogawa, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 1351 days.

(21) Appl. No.: 12/595,145

(22) PCT Filed: Apr. 16, 2008

(86) PCT No.: PCT/JP2008/057790
§ 371 (c)(1),
(2), (4) Date: Oct. 8, 2009

(87) PCT Pub. No.: WO2008/130048
PCT Pub. Date: Oct. 30, 2008

(65) Prior Publication Data
US 2010/0112402 A1 May 6, 2010

(30) Foreign Application Priority Data

Apr. 16, 2007 (JP) .................................. 2007-107297

(51) Int. Cl.
*H01M 8/04* (2006.01)

(52) U.S. Cl.
CPC ........ *H01M 8/04753* (2013.01); *H01M 8/0432* (2013.01); *H01M 8/0488* (2013.01); *H01M 8/04089* (2013.01); *H01M 8/0491* (2013.01); *H01M 8/04268* (2013.01); *H01M 8/04365* (2013.01); *H01M 8/04559* (2013.01); *H01M 8/04589* (2013.01); *H01M 8/04626* (2013.01); *H01M 8/04761* (2013.01); *H01M 8/04992* (2013.01); *Y02E 60/50* (2013.01)

(58) Field of Classification Search
USPC ......................................................... 429/429
See application file for complete search history.

(56) References Cited

U.S. PATENT DOCUMENTS 6,675,573 B2 * 1/2004 Kempfer ........................ 60/284
2002/0182462 A1 * 12/2002 Ballantine et al. .............. 429/23

FOREIGN PATENT DOCUMENTS

| DE | 11 2007 002 394 A1 | 8/2009 |
|---|---|---|
| JP | 64-038969 A | 2/1989 |
| JP | 8-138711 A | 5/1996 |
| JP | 2002-280034 A | 9/2002 |
| JP | 2002-313388 A | 10/2002 |
| JP | 2004-30979 A | 1/2004 |
| JP | 2004-265683 A | 9/2004 |

(Continued)

OTHER PUBLICATIONS

Machine translation of JP 2002-313388 printed Sep. 10, 2012.*

*Primary Examiner* — Maria J Laios
(74) *Attorney, Agent, or Firm* — Kenyon & Kenyon LLP

(57) ABSTRACT

An object of the present invention is to provide a fuel cell system suited for changing a drive operating point of a fuel cell at the time of low-efficiency power generation. The fuel cell system in accordance with the present invention includes a fuel cell which generates electric power by supplied reactant gases, an air compressor which adjusts the flow rate of a reactant gas supplied to the fuel cell, and a controller which controls an output current of the fuel cell by controlling the air compressor to change a drive operating point of the fuel cell. The controller sets a restriction on at least one of a current change amount and a voltage change amount per unit time when changing the drive operating point of the fuel cell in a range of low-efficiency power generation in which a power loss is larger than that in normal power generation.

7 Claims, 7 Drawing Sheets

(56) References Cited

FOREIGN PATENT DOCUMENTS

| JP | 2006-309979 A | 11/2006 |
|---|---|---|
| WO | WO 2004/102720 A1 | 11/2004 |
| WO | WO 2007/063783 A1 | 6/2007 |
| WO | WO 2007/066795 A1 | 6/2007 |
| WO | WO 2008/029862 A1 | 3/2008 |

* cited by examiner

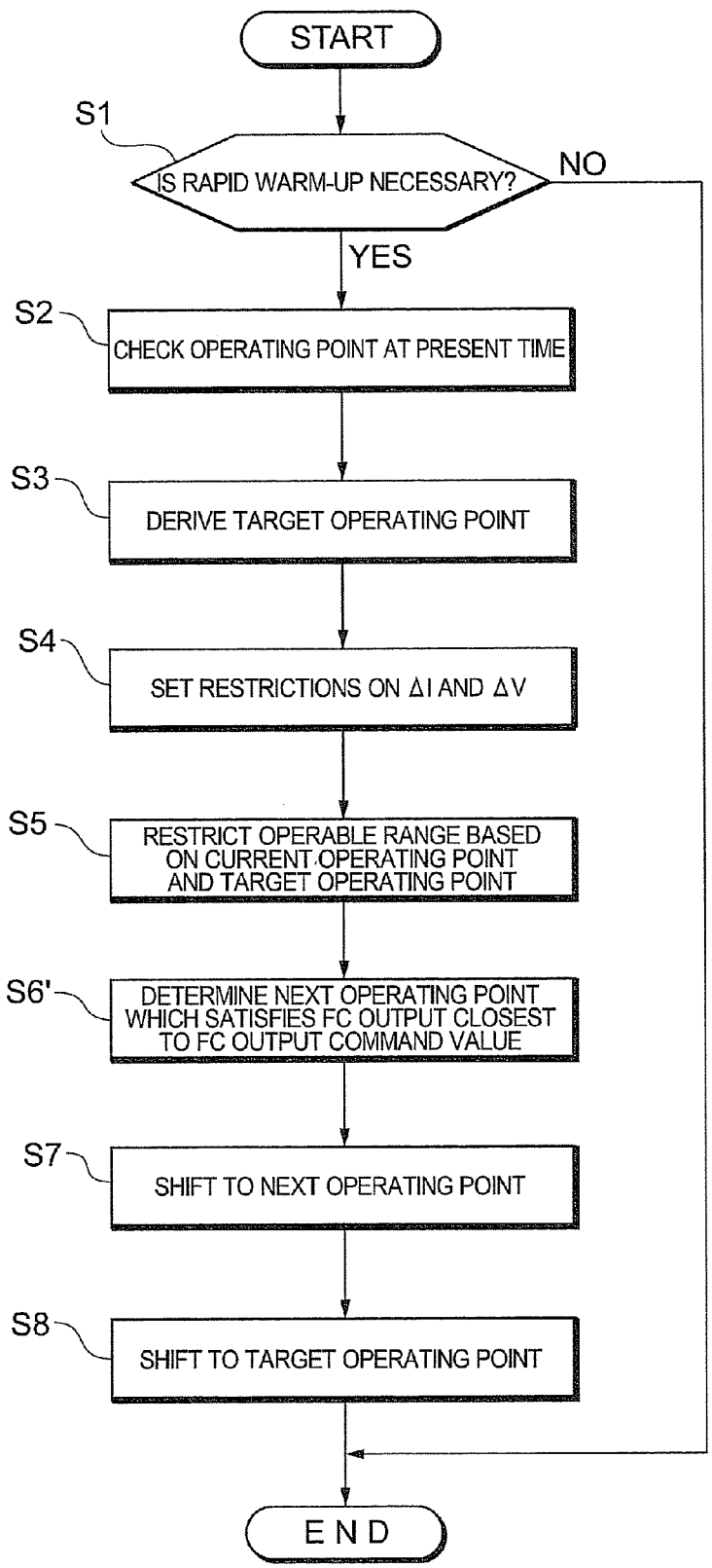

FUEL CELL SYSTEM

This is a 371 national phase application of PCT/JP2008/057790 filed 16 Apr. 2008, which claims priority to Japanese Patent Application No. 2007-107297 filed 16 Apr. 2007, the contents of which are incorporated herein by reference.

TECHNICAL FIELD

The present invention relates to a fuel cell system and more particularly to a fuel cell system adapted to perform low-efficiency power generation of a fuel cell.

BACKGROUND ART

A solid polymer fuel cell mounted on a fuel cell hybrid vehicle or the like generates electric power from a chemical reaction between a fuel gas, which contains hydrogen, and an oxidizing gas (hereinafter generically referred to as "the reactant gases"). An optimum temperature range for the fuel cell to generate electric power is generally known to be 70 to 80° C. However, the power generation by the fuel cell cannot follow a target electric power until the temperature range is reached, and there are cases where equipment (such as a motor) cannot be driven according to a request. There is also a case where it takes a long time to reach the optimum temperature range after the fuel cell is started up, depending on a use environment, such as a freezing temperature.

In view of the situations described above, the fuel cell system disclosed in Japanese Patent Application Laid-Open No. 2002-313388 is adapted to carry out low-efficiency power generation of the fuel cell when a temperature is low, thereby promptly raising the temperature of the fuel cell. The low-efficiency power generation refers to power generation which has a larger power loss, as compared with normal power generation. In other words, the low-efficiency power generation Of the fuel cell refers to power generation in which the efficiency of the power generation is set to be lower than that in the normal power generation so as to increase a self-heating value, as compared with that in the normal power generation. This fuel cell system adopts a method in which the pressure and the flow rate of the reactant gas supplied to the fuel cell are set to be insufficient in order to carry out the low-efficiency power generation.

DISCLOSURE OF INVENTION

In the meantime, if a change amount of current is large when a drive operating point (current and voltage) of a fuel cell is changed during low-efficiency power generation, then the control value of auxiliary equipment (e.g., an air compressor or an air regulation valve), which adjusts the state of the reactant gas supplied to the fuel cell, becomes unstable, inconveniently leading to the occurrence of a fluctuation in auxiliary equipment loss. Similarly, a large change amount of voltage inconveniently causes the charge/discharge of a capacitive component of the fuel cell to take place. If these occur, the output accuracy of the fuel cell deteriorates and hunting occurs in the command value of a request output of the fuel cell. However, the prior art, Japanese Patent Application Laid-Open No. 2002-313388, has given no consideration to the aforesaid aspects.

An object of the present invention is to provide a fuel cell system suited for changing a drive operating point of a fuel cell during low-efficiency power generation.

To attain the object, a fuel cell system in accordance with the present invention comprises a fuel cell which generates electric power by a supplied reactant gas a gas adjusting means which adjusts the states of the reactant gas supplied to the fuel cell; and a controller which controls an output current of the fuel cell by controlling the gas adjusting means and changes the drive operating point of the fuel cell. The controller sets a restriction on at least one of a current change amount and a voltage change amount per unit time when changing the drive operating point of the fuel cell in a range of low-efficiency power generation in which power loss is larger than that in normal power generation.

For example, restricting the current change amount makes it possible to restrain the control value of the gas adjusting means from becoming unstable with resultant occurrence of a fluctuation in equipment loss. Moreover, restricting the voltage change amount makes it possible to restrain the charge/discharge of a capacitive component of the fuel cell. Thus, by conducting such a rate processing on the current or the voltage, the output accuracy of the fuel cell can be secured when the drive operating point is changed in the range of the low-efficiency power generation.

Preferably, the controller calculates a target drive operating point of the fuel cell on the basis of a required output value and a required self-heating value of the fuel cell, and determines a next drive operating point, which will be passed through when the drive operating point is changed from a current drive operating point to the target drive operating point, such that the calculated target drive operating point will not be overshot or undershot.

This arrangement obviates the need for increasing or decreasing an output current or an output voltage of the fuel cell in the series of steps for a change from the current drive operating point to the target drive operating point.

Further preferably, the controller selects a drive operating point which satisfies a required output value of the fuel cell as the next drive operating point.

Further preferably, the controller satisfies the required output value of the fuel cell and then changes the drive operating point from the next drive operating point to the target drive operating point while maintaining the required output value.

This arrangement allows the drive operating point of the fuel cell to be changed while managing the required output of the fuel cell.

According to another preferred mode, if the controller cannot select a drive operating point that satisfies the required output value of the fuel cell as the next drive operating point, the controller selects a drive operating point that satisfies an output value closest to a required output value.

This arrangement makes it possible to satisfy the required output of the fuel cell as much as possible at the next drive operating point which will be passed once.

Preferably, the gas adjusting means includes at least one of a supplier which supplies an oxidizing gas to the fuel cell and a regulation valve which regulates the pressure of an oxidizing off-gas discharged from the fuel cell.

Further preferably, the controller controls the gas adjusting means such that at least one of the supply flow rate and the supply pressure of the oxidizing gas to the fuel cell decreases during the low-efficiency power generation, as compared with the normal power generation.

BRIEF DESCRIPTION OF THE DRAWINGS

FIG. 7 is a flowchart illustrating the processing for shifting the drive operating point of the fuel cell in accordance with the first modification example.

BEST MODE FOR CARRYING OUT THE INVENTION

The following will describe embodiments in accordance with the present invention with reference to the accompanying drawings.

A. Present Embodiment

Figure 1:
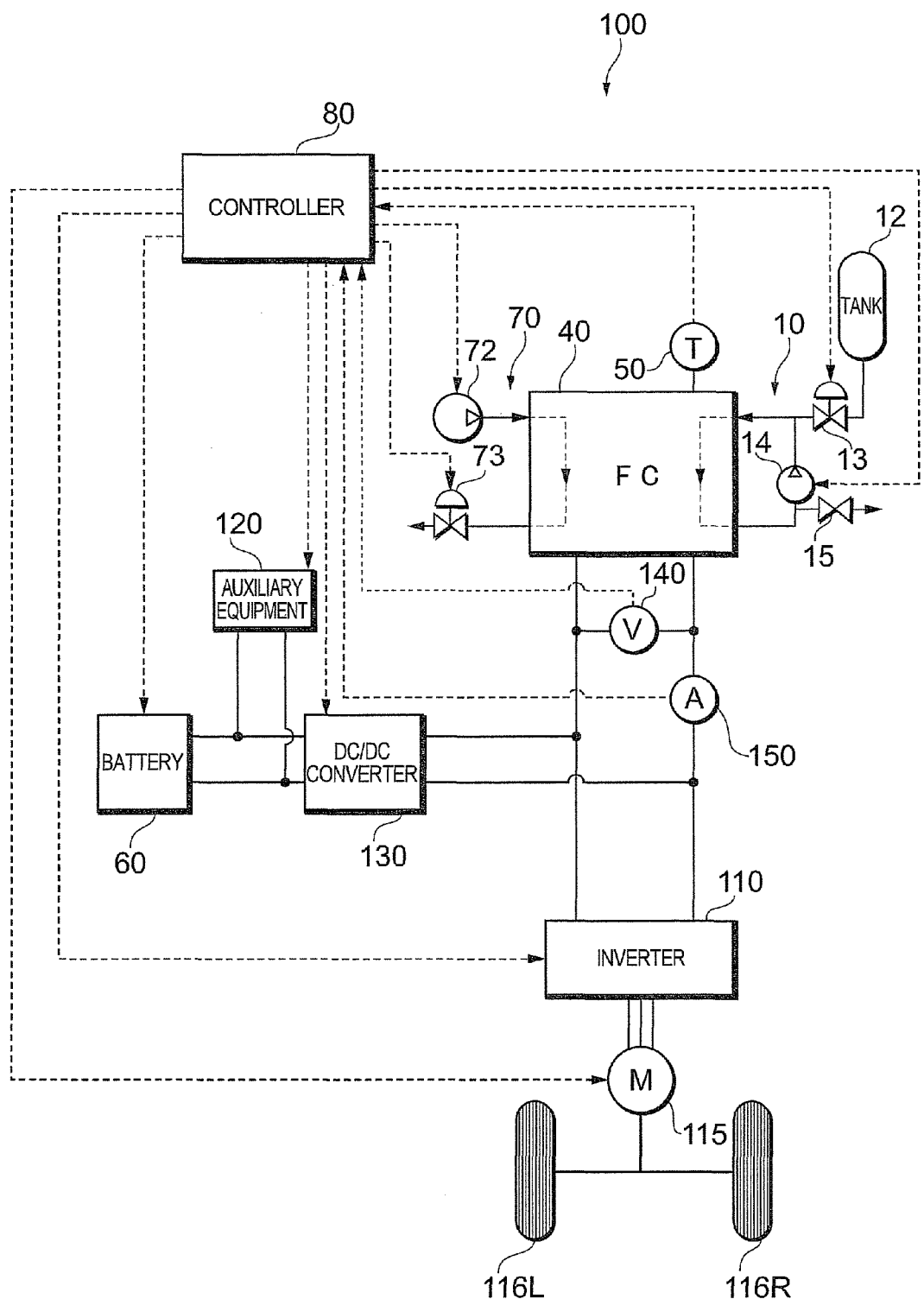
FIG. 1 is a block diagram illustrating a main section of a fuel cell system according to an embodiment.

FIG. 1 is a diagram illustrating the configuration of a main section of a fuel cell system 100 in accordance with the present embodiment. The present embodiment assumes a fuel cell system mounted in a vehicle, such as an FCHV (Fuel Cell Hybrid Vehicle), an electric vehicle, or a hybrid vehicle; however, the fuel cell system is also applicable not only to vehicles but also to a variety of mobile bodies (e.g., a marine vessel, an airplane, or a walking robot) or to a fixed electric power supply.

A fuel cell 40 is a means for generating electric power from supplied reactant gases (a fuel gas and an oxidizing gas), and comes in various types, including a solid polymer type, a phosphoric-acid type, and a molten carbonate type. The fuel cell 40 has a stack structure formed by stacking in series a plurality of unit cells including an MEA or the like. An output voltage (hereinafter referred to as the "FC voltage") and an output current of the fuel cell 40 (hereinafter referred to as the "FC current") are detected by a voltage sensor 140 and a current sensor 150, respectively. An output electric power (hereinafter referred to as the "FC output") of the fuel cell 40 is obtained by multiplying the FC voltage by the FC current.

A fuel gas supply system 10 supplies a fuel gas, such as a hydrogen gas, to a fuel electrode in the fuel cell 40. The fuel gas supply system 10 includes, for example, a hydrogen tank 12, a valve 13, a circulation pump 14, and a purge valve 15. The opening degree, the ON/OFF time or the like of the valve 13 in the fuel gas supply system 10 is adjusted according to a command from a controller 80, thereby controlling the amount of the fuel gas or the pressure of the fuel gas to be supplied to the fuel cell 40. The fuel gas is circulated to the fuel cell 40 by the circulating pump 14, and discharged to the outside when the purge valve 15 is opened.

An oxidizing gas supply system 70 supplies an oxidizing gas, such as air, to an air electrode in the fuel cell 40. The oxidizing gas supply system 70 includes, for example, an air compressor 72 and a regulation valve 73 as the gas adjusting means for the oxidizing gas. The revolution speed or the like of a motor, which is a driving source, in the air compressor 72 is adjusted according to a command from the controller 80, thereby controlling the amount of the oxidizing gas to be supplied to the fuel cell 40. Further, the opening degree of the regulation valve 73 is adjusted according to a command from the controller 80, thereby controlling the pressure of the oxidizing gas to be supplied to the fuel cell 40.

A battery (electric storage device) 60 is a secondary cell which is chargeable/dischargeable and constituted by, for example, a nickel hydride battery. In place of the battery 60, a chargeable/dischargeable electric condenser (e.g., a capacitor) other than the secondary cell may be provided. The battery 60 is connected in parallel to the fuel cell 40 through a DC/DC converter 130.

An inverter 110 is, for example, a PWM inverter of the pulse-width modulation method. The inverter 110 converts a DC current output from the fuel cell 40 or the battery 60 into a three-phase alternating current according to a control command from the controller 80 and supplies the three-phase alternating current to a traction motor 115. The traction motor 115 is adapted to drive wheels 116L and 116R, the revolution speed thereof being controlled by the inverter 110. The traction motor 115 and the inverter 110 are connected on a side of the fuel cell 40.

The DC/DC converter 130 has a function for increasing or decreasing a DC voltage input from the battery 60 and outputting the increased or decreased DC voltage to the inverter 110 and a function for increasing or decreasing a DC voltage input from the fuel cell 40 or the like and outputting the increased or decreased DC voltage to the battery 60. By a function of the DC/DC converter 130, the charge/discharge of the battery 60 is implemented and the FC voltage of the fuel cell 2 is controlled. Incidentally, a lower limit value of the FC voltage is allowed to be down to a control limit value by the DC/DC converter 130.

Auxiliary equipment 120, such as vehicle auxiliary equipment and FC auxiliary equipment, is connected between the battery 60 and the DC/DC converter 130 through an inverter (not shown). The battery 60 serves as a power source for the auxiliary equipment 120. The vehicle auxiliary equipment refers to various electric equipment (lighting equipment, air conditioning equipment, a hydraulic pump, and the like) used when a vehicle is driven. The FC auxiliary equipment refers to various electric equipment, such as the valve 13, the circulating pump 14, the air compressor 72, and the regulation valve 73 described above which are used for operating the fuel cell 40. However, in another embodiment, the traction motor 115 and the inverter 110 may be connected on a side of the battery 60.

The controller 80 is constructed as a microcomputer incorporating a CPU, a ROM, and a RAM therein. The CPU executes desired computation according to a control program to carry out various types of processing and control, such as changing the drive operating point of the fuel cell 40, which will be described later. The ROM stores a control program and control data to be processed by the CPU. The RAM is used mainly as various work areas for control processing.

The controller 80 receives sensor signals mainly from a voltage sensor 140, a current sensor 150, a temperature sensor 50 which detects the temperature of the fuel cell 40, a SOC sensor which detects the state of charge of the battery 60, an external temperature sensor which detects an environmental temperature under which the fuel cell system 1 is placed, and an accelerator pedal sensor which detects the opening degree of an accelerator pedal of a fuel cell hybrid vehicle. Then, the controller 80 centrically controls each section of the system based on the sensor signals. In particular, in the case where the fuel cell 40 needs to be rapidly warmed up at a low-temperature startup or the like, the controller 80 shifts the drive operating point of the fuel cell 40 and performs an operation with low efficiency of power generation by using various maps stored in the ROM.

Figure 2A:
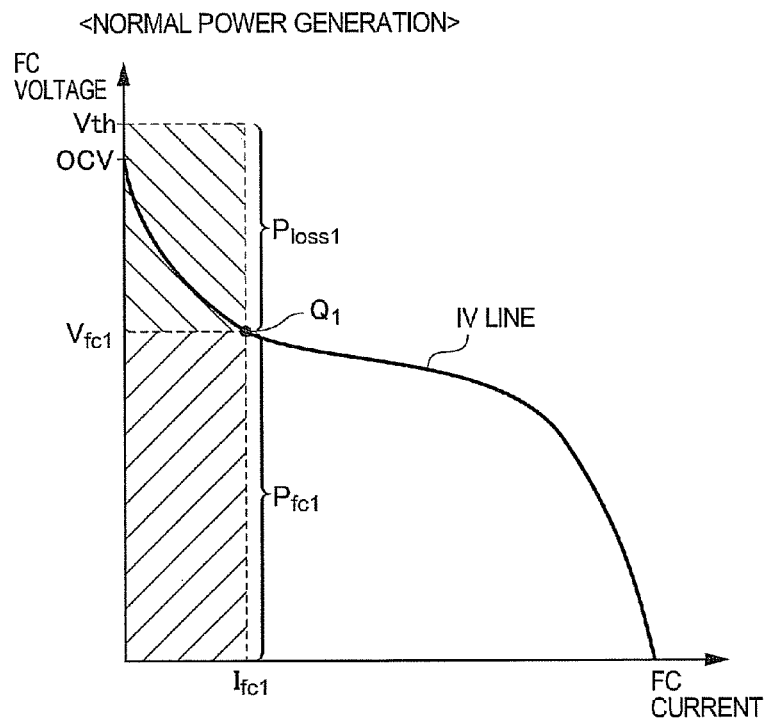
FIGS. 2A and 2B are diagrams illustrating a relationship between output electric power and electric power loss of a fuel cell according to the embodiment, FIG. 2A illustrating the case of normal power generation, while FIG. 2B illustrating the case of low-efficiency power generation.
Figure 2B:
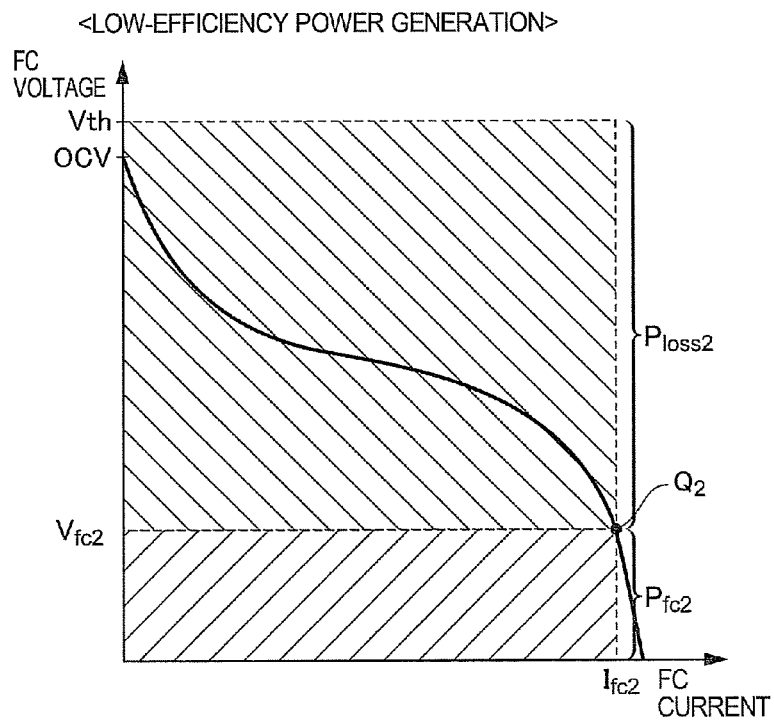

Referring to FIGS. 2A and 2B, the drive operating point (current and voltage) of the fuel cell 40 will be described in detail. In the following description, the drive operating point will be abbreviated as simply "the operating point."

FIGS. 2A and 2B are diagrams illustrating a relationship between an FC output $P_{fc}$ and a power loss $P_{loss}$ when the fuel cell 40 is operated at different operating points, the axis of abscissas indicating an FC current $I_{fc}$ and the axis of ordinates indicating an FC voltage $V_{fc}$. Further, OCV (Open Circuit Voltage) given in FIGS. 2A and 2B denotes a voltage when no current is output from the fuel cell 40, and $V_{th}$ denotes a theoretical electromotive voltage of the fuel cell 40. Take an example, if the fuel cell 40 has four-hundred unit cells, then the OCV will be 400V, and $V_{th}$ will be 492V at a cell theoretical electromotive voltage of 1.23V. The voltage corresponding to actual total energy is assumed to range from 1.25V to 1.48V. If, however, it is assumed that there is no external heat dissipation, then the aforesaid theoretical value may apply.

The fuel cell 40 exhibiting the current/voltage characteristic (hereinafter referred to as "the IV characteristic") illustrated in FIGS. 2A and 2B is generally run at an operating point $Q_1$ ($I_{fc1}$, $V_{fc1}$) having a small power loss $P_{loss}$ relative to the FC output $P_{fc}$ (refer to FIG. 2A). However, the internal temperature of the fuel cell 40 must be raised when promptly warming up the fuel cell 40. The present embodiment performs the operation by shifting the operating point to an operating point $Q_2$ ($I_{fc2}$, $V_{fc2}$), which has a large power loss $P_{loss}$, while securing necessary FC output $P_{fc}$ (refer to FIG. 2B). The power loss $P_{loss}$ is actively utilized as heat energy in order to provoke the self-heating of the fuel cell 40 thereby to raise the internal temperature thereof.

Here, the relationship between the FC output $P_{fc}$ and the power loss $P_{loss}$ at each operating point illustrated in FIGS. 2A and 2B is as shown below.

<Regarding the Operating Point $Q_1$ ($I_{fc1}$, $V_{fc1}$)>

$$I_{fc1} \times V_{fc1} = P_{fc1} \quad (3)$$

$$I_{fc1} \times V_{th} - P_{fc1} = P_{loss1} \quad (4)$$

<Regarding the Operating Point $Q_2$ ($I_{fc2}$, $V_{fc2}$)>

$$I_{fc2} \times V_{fc2} = P_{fc2} \quad (5)$$

$$I_{fc2} \times V_{th} - P_{fc2} = P_{loss2} \quad (6)$$

<Relationship Between FC Output $P_{fc}$ and Power Loss $P_{loss}$>

$$P_{fc1} = P_{fc2} \quad (7)$$

$$P_{loss1} < P_{loss2} \quad (8)$$

Figure 3:
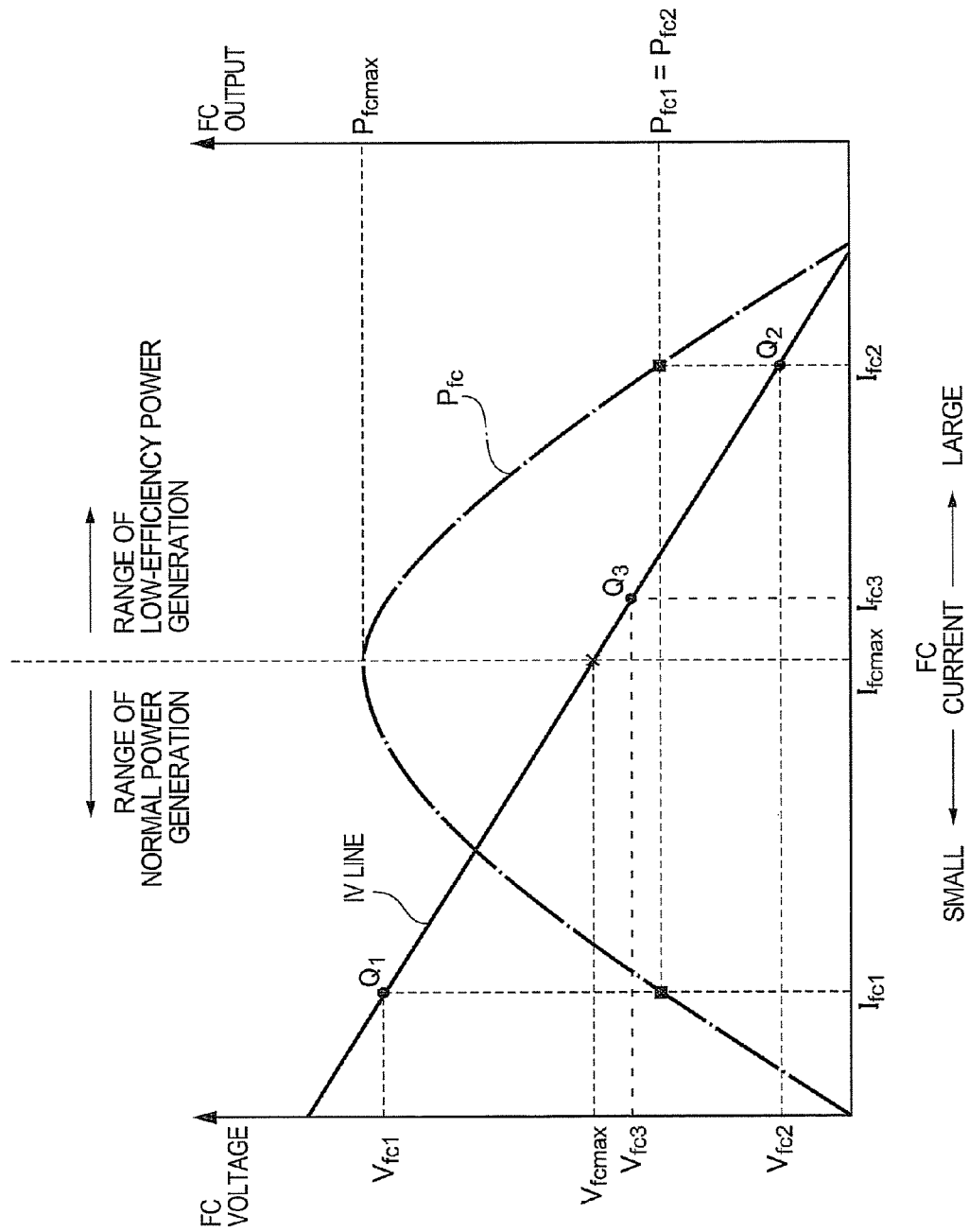
FIG. 3 is a diagram illustrating changes in FC outputs observed during an operation performed while shifting the drive operating point of the fuel cell in accordance with the embodiment.

FIG. 3 is a diagram illustrating a change in the FC output $P_{fc}$ when the fuel cell 40 is operated while shifting the operating point, the axis of abscissas indicating the FC current and the axes of ordinates indicating the FC voltage and the FC output. Incidentally, in FIG. 3, for the convenience of explanation, the line indicating the IV characteristic of the fuel cell 40 (hereinafter referred to as "the IV line") is shown in the form of a straight line. Further, it is assumed that the operating points $Q_1$ ($I_{fc1}$, $V_{fc1}$) and $Q_2$ ($I_{fc2}$, $V_{fc2}$) on the IV line correspond to the operating points $Q_1$ ($I_{fc1}$, $V_{fc1}$) and $Q_2$ ($I_{fc2}$, $V_{fc2}$) shown in FIGS. 2A and B.

As illustrated in FIG. 3, centering around a maximum output operating point ($I_{fcmax}$, $V_{fcmax}$) at which a maximum FC output $P_{fcmax}$ is obtained, the FC output $P_{fc}$ increases as the FC voltage $V_{fc}$ decreases at an operating point on the IV line given on the left side in the diagram, while the FC output $P_{fc}$ decreases as the FC voltage $V_{fc}$ decreases at an operating point on the IV line given on the right side in the diagram.

As previously described, the power loss $P_{loss}$ increases as the FC voltage $V_{fc}$ drops. For this reason, even if the fuel cell 40 is operated to output the same electric power, the power loss $P_{loss}$ is larger in an operation at an operating point (e.g., the operating point $Q_2$) on the IV line shown on the right side of the maximum output operating point than the power loss $P_{loss}$ obtained in an operation (e.g., the operating point $Q_1$) at an operating point on the IV line shown on the left side of the maximum output operating point. Therefore, in the following explanation, the range which includes the operating points on the IV line on which the FC output $P_{fc}$ increases as the FC voltage $V_{fc}$ decreases is defined as the range of normal power generation. Further, the range which includes the operating points on the IV line on which the FC output $P_{fc}$ decreases as the FC voltage $V_{fc}$ decreases is defined as the range of low-efficiency power generation.

The operating points in the normal power generation and the low-efficiency power generation are expressed as follows.
<Regarding the Operating Points ($I_{fc}$, $V_{fc}$) in the Normal Power Generation>

$$I_{fc} \leq I_{fcmax} \quad (9)$$

$$V_{fcmax} \leq V_{fc} \quad (10)$$

<Regarding the Operating Points ($I_{fc}$, $V_{fc}$) in the Low-Efficiency Power Generation>

$$I_{fcmax} < I_{fc} \quad (11)$$

$$V_{fc} < V_{fcmax} \quad (12)$$

In the case of the normal power generation, the air stoichiometric ratio is set to 1.0 or more. The air stoichiometric ratio refers to an oxygen surplus rate and indicates how much surplus oxygen is supplied in relation to the oxygen required for a reaction with hydrogen without excess or deficiency. Meanwhile, in the case of the low-efficiency power generation, the air stoichiometric ratio is set to below 1.0, leading to a state wherein an insufficient oxidizing gas is supplied to the fuel cell 40. The FC current $I_{fc}$ of the fuel cell 40 is controlled by the amount of the oxidizing gas (the air stoichiometric ratio). Incidentally, the amount of the oxidizing gas (the air stoichiometric ratio) is controlled by the revolution speed of the motor of the air compressor 72, as described above.

The target values (an FC current target value $I_{req}$ and an FC voltage target value $V_{req}$) of the operating points in the low-efficiency power generation are determined based on an FC output command value $P_{ref}$ (i.e., a required output value) and an FC self-heating command value $L_{ref}$ (i.e., a required self-heating value) as shown below.

$$I_{req} = (P_{ref} + L_{ref})/V_{th} \quad (13)$$

$$V_{req} = P_{ref}/I_{req} = P_{ref}/\{(P_{ref} + L_{ref})/V_{th}\} \quad (14)$$

Here, the FC output command value $P_{ref}$ denotes a required power of the fuel cell system 100. The FC self-heating command value $L_{ref}$ denotes the heating value required to promptly warming up the fuel cell 40, and is set by incorporating, for example, a detection result of the external temperature sensor or the temperature sensor 50. If the FC output command value $P_{ref}$ or the FC self-heating command value $L_{ref}$ is changed during a low-efficiency power generation in response to a user request or the like, then the target value of the operating point of the fuel cell 40 changes. The target value of an operating point is changed from the range of the normal power generation to the rage of the low-efficiency power generation, vice versa, and within each range.

Figure 4:
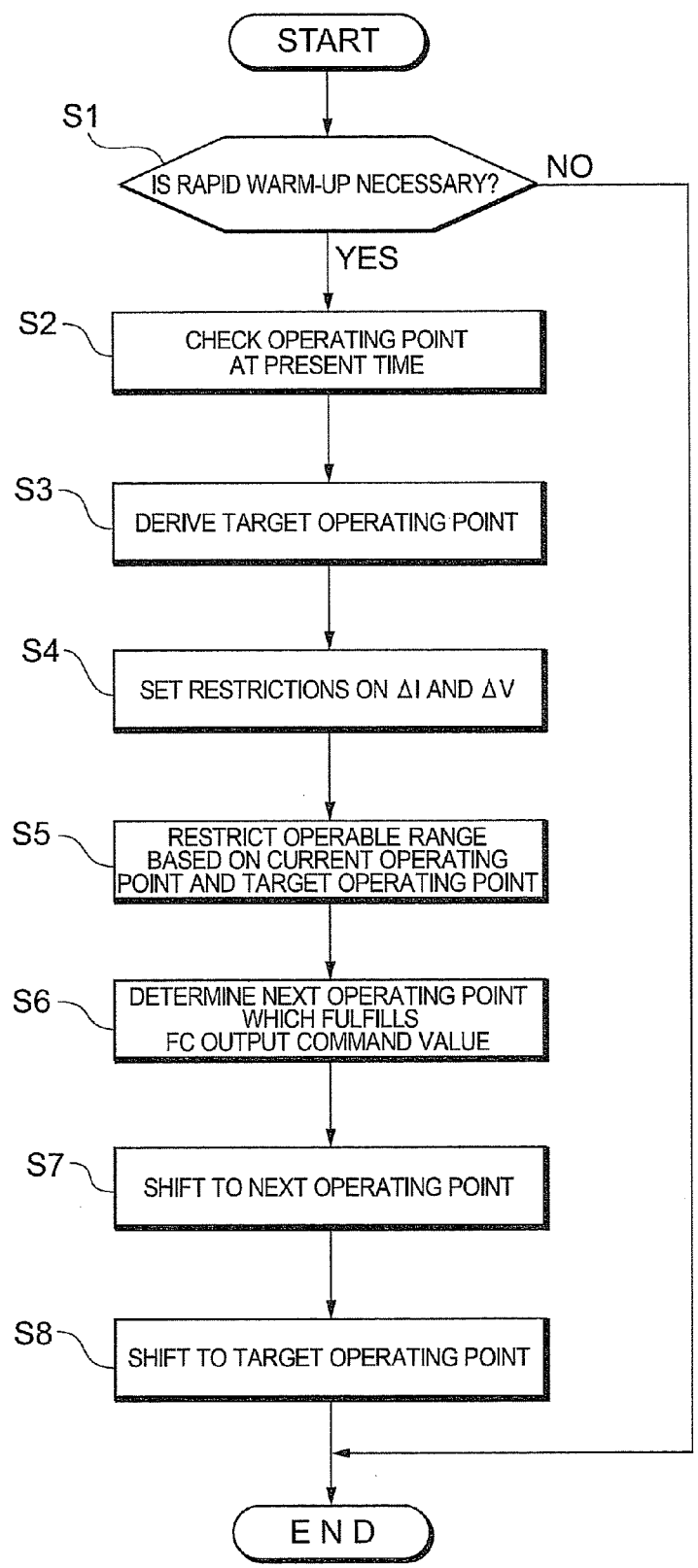
FIG. 4 is a flowchart illustrating the processing for shifting the drive operating point of the fuel cell in accordance with the embodiment.
Figure 5:
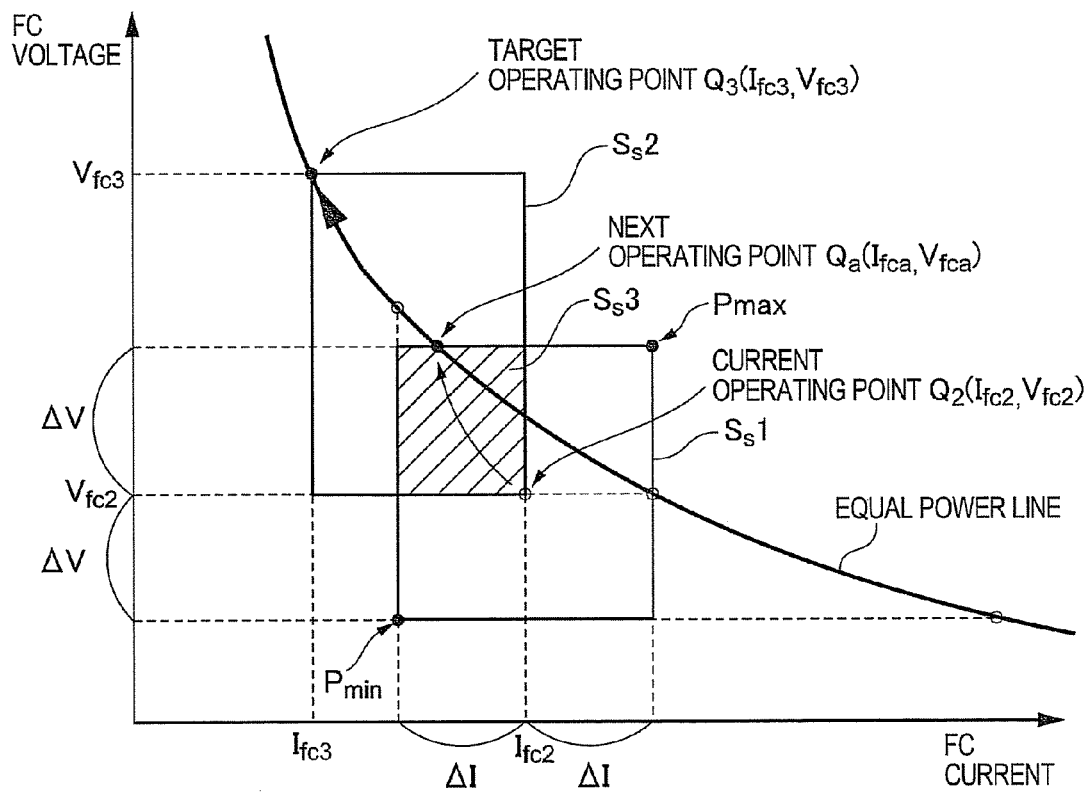
FIG. 5 is a diagram illustrating a technique for shifting the drive operating points of the fuel cell in accordance with the embodiment.

FIG. 4 is a flowchart illustrating the processing for shifting an operating point, and FIG. 5 is a diagram illustrating a technique for shifting operating points. In the following description, a case is assumed where an operating point of the fuel cell 40 is changed within the range of the low-efficiency power generation. As an example, the processing for making a shift from a current operating point $Q_2$ ($I_{fc2}$, $V_{fc2}$) to a target operating point $Q_3$ ($I_{fc3}$, $V_{fc3}$) shown in FIGS. 3 and 5 will be described. The curve passing the operating point $Q_3$ shown in FIG. 5 is an equal power line indicating the same power (FC output) as the operating point $Q_3$ and has the following relationship with the FC output command value $P_{ref}$.

$$P_{ref} = I_{fc3} \times V_{fc3} \quad (15)$$

The controller 80 first determines whether the fuel cell 40 needs to be rapidly warmed up (step S1). To be specific, if the temperature detected by the external temperature sensor or the temperature sensor 50 is not a low temperature (e.g., 0° C. or lower), then it is determined that the rapid warm-up is unnecessary (No in step S1). On the other hand, if the detected temperature is a low temperature (e.g., 0° C. or lower), then it is determined that the rapid warm-up is necessary (Yes in step S1), and the operating point at the present time (here, $Q_2$ ($I_{fc2}$, $V_{fc2}$)) is checked (step S2).

Subsequently, the controller 80 derives a target operating point from the FC output command value $P_{ref}$ and the FC self-heating command value $L_{ref}$ (step S3). In this case, the operating point $Q_3$ ($I_{fc3}$, $V_{fc3}$) is derived as the target operating point.

Subsequently, the controller 80 sets restrictions on a current change amount $\Delta I$ and a voltage change amount $\Delta V$ per unit time from the current operating point $Q_2$ ($I_{fc2}$, $V_{fc2}$) (step S4). The current change amount $\Delta I$ and the voltage change amount $\Delta V$ are set to values not exceeding the capacity of the fuel cell system 100. To be specific, the current change amount $\Delta I$ is set to a current rate at which the responsiveness of the air compressor 72 can be satisfies. The voltage change amount $\Delta V$ is set to a voltage rate at which the charge/discharge by a capacitive component of the fuel cell 40 can be restrained. Setting such restrictions makes it possible to restrain the control value of the air compressor 72 from becoming unstable, leading to the occurrence of a change in an operating point due to a fluctuation in the revolution speed of the motor of the air compressor 72. Further, the charge/discharge of the capacitive component of the fuel cell 40 can be restrained.

Then, the controller 80 calculates a maximum value $P_{max}$ and a minimum value $P_{min}$ of an output change based on the current change amount $\Delta I$ and the voltage change amount $\Delta V$ according to expressions (15) and (16) given below. Further, the controller 80 carries out upper limit processing for setting the maximum value as an output change maximum value $P_{max}$ and lower limit processing for setting the minimum value as an output change minimum value $P_{min}$, and calculates an operable range Ss1 (i.e., an FC output change permissible value) that permits changes. The operable range Ss1 is the range indicated by the square box shown in FIG. 5. Hence, according to step S4, the controller 80 restricts the operating point from being changed to anywhere outside the operable range Ss1.

$$P_{max} = (I_{fc2} + \Delta I) \times (V_{fc2} + \Delta V) \quad (15)$$

$$P_{min} = (I_{fc2} + \Delta I) \times (V_{fc2} + \Delta V) \quad (16)$$

Subsequently, the controller 80 further restricts the operable range based on the current operating point and the target operating point (step S5). To be specific, the controller 80 restricts the changing directions of the current and the voltage based on the current operating point $Q_2$ ($I_{fc2}$, $V_{fc2}$) and the target operating point $Q_3$ ($I_{fc3}$, $V_{fc3}$). In addition, the controller 80 limits the restricted range to a range within which the current $I_{fc3}$ and the voltage $V_{fc3}$ of the operating point $Q_3$ are not overshot or undershot. Thus, the controller 80 determines an operable range Ss2 permitting a change. According to steps S4 and S5 described above, an operating point to which the current operating point $Q_2$ ($I_{fc2}$, $V_{fc2}$) can be shifted lies in a range Ss3 indicated by hatching wherein the operable ranges Ss1 and Ss2 overlap each other.

However, the target operating point $Q_3$ ($I_{fc3}$, $V_{fc3}$) is positioned outside the range Ss3. The controller 80, therefore, determines a next operating point $Q_a$ ($I_{fca}$, $V_{fca}$) in the hatched range Ss3, the next operating point $Q_a$ being passed in the shifting from the operating point $Q_2$ ($I_{fc2}$, $V_{fc2}$) to the operating point $Q_3$ ($I_{fc3}$, $V_{fc3}$) (step S6). Here, the next operating point $Q_a$ is not restricted as long as it remains within the range Ss3. Preferably, however, the next operating point $Q_a$ is determined to be an operating point on the equal power line fulfilling the FC output command value $P_{ref}$. This allows the next operating point $Q_a$ to satisfy a final FC output command value $P_{ref}$. In this case, the following relational expression holds.

$$I_{fca} \times V_{fca} = I_{fc3} \times V_{fc3} = P_{ref} \quad (17)$$

Subsequently, the controller 80 starts shifting the operating point to change the current operating point $Q_2$ ($I_{fc2}$, $V_{fc2}$) to the next operating point $Q_a$ ($I_{fca}$, $V_{fca}$) (step S7). At this time, the controller 80 controls the FC voltage $V_{fc}$ and the FC current $I_{fc}$ such that the operating point traces a shortest operating point transition route from the operating point $Q_2$ ($I_{fc2}$, $V_{fc2}$) to the operating point $Q_a$ ($I_{fca}$, $V_{fca}$). To be specific, the controller 80 controls the FC voltage $V_{fc}$ by using the DC/DC converter 130 to increase it to the next voltage $V_{fca}$. In addition, the controller 80 controls the air compressor 72 to adjust the amount of the oxidizing gas to the fuel cell 40 (here, the oxidizing gas amount is decreased). Thus, the controller 80 reduces the FC current $I_{fc}$ to the next current $I_{fca}$.

After the change to the next operating point $Q_a$ ($I_{fca}$, $V_{fca}$), the controller 80 further starts shifting the operating point to change it from the operating point $Q_a$ ($I_{fca}$, $V_{fca}$) to the target operating point $Q_3$ ($I_{fc3}$, $V_{fc3}$) (step S8). In this case, the controller 80 controls the FC voltage $V_{fc}$ and the FC current $I_{fc}$ by controlling the DC/DC converter 130 and the air compressor 72 such that the operating point $Q_3$ ($I_{fc3}$, $V_{fc3}$) is reached by the transition on the equal power line. By this control, the change to the target operating point $Q_3$ is completed while the FC output $P_{fc}$ of the fuel cell 40 is maintained at a constant level.

As described above, the fuel cell system 100 in accordance with the present embodiment conducts a rate processing on the current and the voltage to change the operating point of the fuel cell 40 in the range of the low-efficiency power generation. This makes it possible to restrain a fluctuation in auxiliary equipment loss (fluctuation in the air compressor 72) and also to restrain the charge/discharge of the capacitive component of the fuel cell 40. Hence, the output accuracy of the fuel cell 40 can be improved. Especially the process of the series of changing steps for an operating point has obviated the need for increasing or decreasing the FC current $I_{fc}$ and the FC voltage $V_{fc}$, and the FC output $P_{fc}$ can be controlled rather than letting it take its course, thus allowing the operating point of the fuel cell 40 to be ideally changed. Moreover, the traceability of the air auxiliary equipment (the air compressor 72) can be properly secured by an electric power control system.

In another embodiment, the restriction may be set on only either the current change amount ΔI or the voltage change amount ΔV in step S4. In other words, in step S4, the restriction may be set on at least one of the current change amount ΔI and the voltage change amount ΔV.

B. Modification Example

A modification example of the fuel cell system 100 will now be described.

First Modification Example

Figure 6:
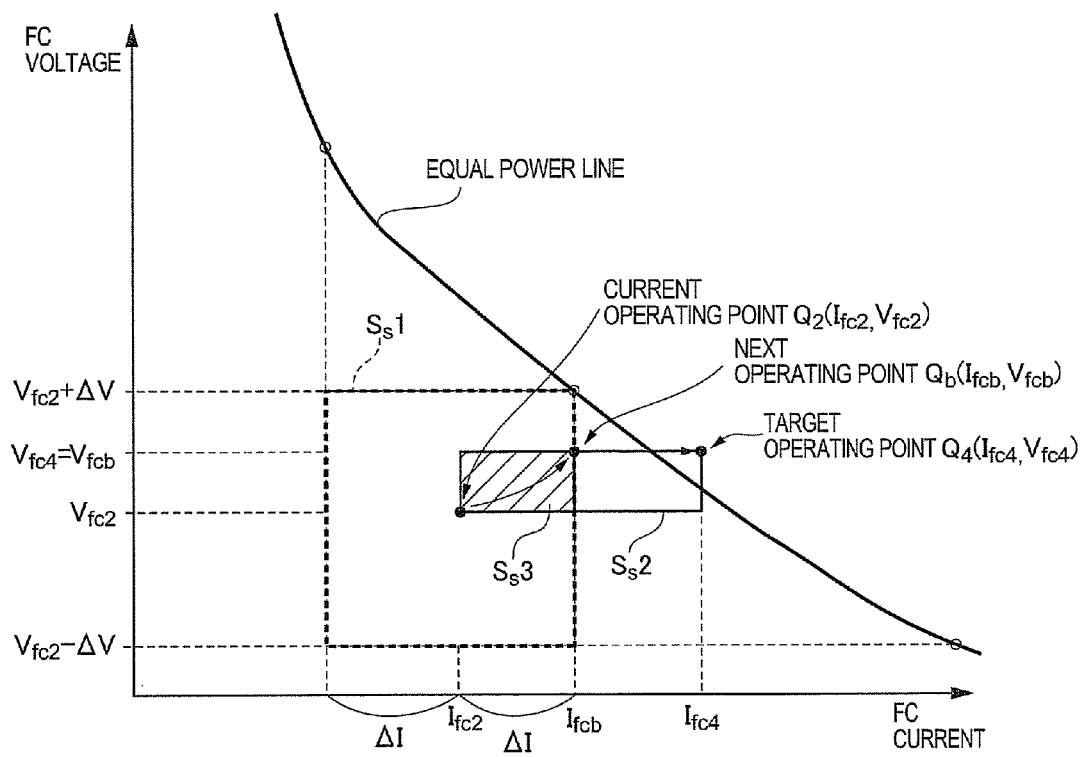
FIG. 6 is a diagram illustrating a technique for shifting the drive operating point of a fuel cell in accordance with a first modification example.

FIG. 6 is a diagram illustrating a technique for shifting an operating point according to a first modification example, and FIG. 7 is a flowchart illustrating the processing for shifting an operating point according to the first modification example. In the following description, a case where the operating point of the fuel cell 40 is changed in the range of the low-efficiency power generation will be assumed, and the description will be given of the processing for changing a current operating point $Q_2$ ($I_{fc2}$, $V_{fc2}$) to a target operating point $Q_4$ ($I_{fc4}$, $V_{fc4}$) illustrated in FIG. 6, as an example.

The controller 80 carries out the same steps S1 to S5 as those of the aforesaid embodiment, as illustrated in FIG. 7. For example, the controller 80 sets restrictions on the current change amount ΔI and the voltage change amount ΔV in step S4 so as to set an operable range Ss1. Further, the controller 80 restricts the changing directions of current and voltage based on the current operating point $Q_2$ ($I_{fc2}$, $V_{fc2}$) and the target operating point $Q_4$ ($I_{fc4}$, $V_{fc4}$) in step S5, and further limits the restricted ranges to ranges in which the current $I_{fc4}$ and the voltage $V_{fc4}$ of the operating point $Q_4$ will not be overshot or undershot. Thus, the controller 80 determines an operable range Ss2 permitting a change. As a result, an operating point to which the current operating point $Q_2$ ($I_{fc2}$, $V_{fc2}$) can be shifted lies in a range Ss3 indicated by hatching wherein the operable ranges Ss1 and Ss2 overlap each other.

Subsequently, the controller 80 selects a next operating point $Q_b$ ($I_{fcb}$) $V_{fcb}$) in the range Ss3. However, unlike the aforesaid embodiment, no operating point exists on an equal power line fulfilling the FC output command value $P_{ref}$ in the range Ss3. Therefore, the controller 80 cannot select an operating point that satisfies the FC output command value $P_{ref}$. In this case, the controller 80 may determine an operating point that satisfies an FC output $P_{fc}$ closest to the FC output command value $P_{ref}$ in the range Ss3 as the next operating point $Q_b$ ($I_{fcb}$, $V_{fcb}$) (step S6'). This makes it possible to satisfy the FC output command value $P_{ref}$ as much as possible at the next operating point $Q_b$ which will be passed once.

The relationship among the current operating point $Q_2$ ($I_{fc2}$, $V_{fc2}$), the next operating point $Q_b$ ($I_{fcb}$, $V_{fcb}$), and the target operating point $Q_4$ ($I_{fc4}$, $V_{fc4}$) is as shown below.

$$I_{fc2} < I_{fcb} < I_{fc4} \quad (18)$$

$$V_{fc2} < V_{fcb} = V_{fc4} \quad (19)$$

Subsequently, the controller 80 changes the current operating point $Q_2$ ($I_{fc2}$, $V_{fc2}$) to the next operating point $Q_b$ ($I_{fcb}$, $V_{fcb}$) (step S7). Thereafter, the controller 80 further starts shifting the operating point to make the change from the operating point $Q_b$ ($I_{fcb}$, $V_{fcb}$) to the target operating point $Q_4$ ($I_{fc4}$, $V_{fc4}$) (step S8). In every case of the shift processing, the controller 80 controls the DC/DC converter 130 and the air compressor 72 so as to control the FC voltage $V_{fc}$ and the FC current $I_{fc}$ such that the operating point traces a shortest operating point transition route from an initial operating point to an operating point after a change.

Thus, according to the first modification example, even in the case where the next operating point cannot be set on the equal power line of the target operating point $Q_4$ ($I_{fc4}$, $V_{fc4}$), the operating point of the fuel cell 40 can be ideally changed, as with the aforesaid embodiment.

Second Modification

In the aforesaid embodiment, the amount of the oxidizing gas has been adjusted to control the FC current $I_{fc}$; alternatively, however, the pressure of the oxidizing gas may be adjusted to control the FC current $I_{fc}$. To be specific, the controller 80 may control the FC current $I_{fc}$ by controlling the regulation valve 73 such that the pressure of the oxidizing gas supplied to the fuel cell 40 is lower in the low-efficiency power generation than that in a normal power generation mode.

Further, the FC current $I_{fc}$ may be controlled by adjusting the state of a fuel gas rather than by adjusting the state of the oxidizing gas to the fuel cell 40. For example, the controller 80 may control the valve 13 or the pump 14 thereby to control the FC current $I_{fc}$ such that the amount of the fuel gas supplied to the fuel cell 40 is lower in the low-efficiency power generation than that in the normal power generation mode. Alternatively, the controller 80 may control the valve 13 thereby to control the FC current $I_{fc}$ such that the pressure of the fuel gas supplied to the fuel cell 40 is lower in the low-efficiency power generation than that in the normal power generation mode.

The invention claimed is:

1. A fuel cell system comprising:
    a fuel cell which generates electric power by a supplied reactant gas;
    a gas adjusting device which adjusts a state of the reactant gas supplied to the fuel cell; and
    a controller which is programmed to control an output current of the fuel cell by controlling the gas adjusting device to change a drive operating point of the fuel cell;
    wherein the controller sets a restriction on at least one of a current change amount and a voltage change amount per unit time when changing the drive operating point of the fuel cell in a range of low-efficiency power generation in which power loss is larger than that in normal power generation,
    wherein the restriction on at least one of the current change amount and the voltage change amount per unit time is set based on a capacity of a fuel cell system, and
    wherein the controller is further programmed to calculate an output change permissible value of the fuel cell from the set restriction value, and limit the change in the drive operating point to remain within an output change permissible range.

2. A fuel cell system comprising:
    a fuel cell which generates electric power by a supplied reactant gas;
    a gas adjusting device which adjusts a state of the reactant gas supplied to the fuel cell; and
    a controller which is programmed to control an output current of the fuel cell by controlling the gas adjusting device to change a drive operating point of the fuel cell;
    wherein the controller sets a restriction on at least one of a current change amount and a voltage change amount per unit time when changing a drive operating point of the fuel cell in a range of low-efficiency power generation in which power loss is larger than that in normal power generation, wherein the controller calculates a target drive operating point of the fuel cell based on a required output value of the fuel cell and a required self-heating value of the fuel cell, and determines a next drive operating point, which will be passed through when the drive operating point is changed from a current drive operating point to the target drive operating point, such that the calculated target drive operating point will not be overshot or undershot.

3. The fuel cell system according to claim 2, wherein the controller selects a drive operating point which satisfies a required output value of the fuel cell as the next drive operating point.

4. The fuel cell system according to claim 3, wherein the controller satisfies the required output value of the fuel cell and then changes the drive operating point from the next drive operating point to the target drive operating point while maintaining the required output value.

5. The fuel cell system according to claim 2, wherein if the controller cannot select a drive operating point that satisfies the required output value of the fuel cell as the next drive operating point, the controller selects a drive operating point that satisfies an output value closest to a required output value.

6. The fuel cell system according to claim 1, wherein the gas adjusting device includes at least one of a supplier which supplies an oxidizing gas to the fuel cell and a regulation valve which regulates the pressure of an oxidizing off-gas discharged from the fuel cell.

7. The fuel cell system according to claim 6, wherein the controller controls the gas adjusting device such that at least one of a supply flow rate and a supply pressure of the oxidizing gas to the fuel cell is lower in the low-efficiency power generation than that in the normal power generation.

* * * * *